(12) United States Patent
Michaelis et al.

(10) Patent No.: US 7,149,337 B2
(45) Date of Patent: Dec. 12, 2006

(54) METHOD OF DETECTING FLAWS IN THE STRUCTURE OF A SURFACE

(75) Inventors: Bernd Michaelis, Biederitz (DE); Peter Albrecht, Magdeburg (DE); Tilo Lilienblum, Magdeburg (DE)

(73) Assignee: INB Vision AG, Magdeburg (DE)

( * ) Notice: Subject to any disclaimer, the term of this patent is extended or adjusted under 35 U.S.C. 154(b) by 396 days.

(21) Appl. No.: 09/995,982

(22) Filed: Nov. 21, 2001

(65) Prior Publication Data

US 2002/0072874 A1 Jun. 13, 2002

(30) Foreign Application Priority Data

Nov. 22, 2000 (DE) ................. 100 57 928

(51) Int. Cl.
*G06K 9/00* (2006.01)
(52) U.S. Cl. .............. 382/141; 382/156; 356/601; 356/603; 706/15
(58) Field of Classification Search ............... 382/128, 382/132, 155, 156, 260, 195, 199, 141; 706/15, 706/16, 25, 22, 911; 702/33; 604/408; 128/925; 367/8; 356/2, 603, 601
See application file for complete search history.

(56) References Cited

U.S. PATENT DOCUMENTS

| | | | | |
|---|---|---|---|---|
| 4,842,411 A | * | 6/1989 | Wood | 356/603 |
| 5,031,154 A | * | 7/1991 | Watanabe | 367/8 |
| 5,408,424 A | * | 4/1995 | Lo | 708/303 |
| 5,473,532 A | * | 12/1995 | Unno et al. | 700/32 |
| 5,790,690 A | * | 8/1998 | Doi et al. | 382/128 |
| 5,812,992 A | * | 9/1998 | de Vries | 706/25 |
| 5,873,824 A | * | 2/1999 | Doi et al. | 600/408 |
| 5,999,639 A | * | 12/1999 | Rogers et al. | 382/132 |

FOREIGN PATENT DOCUMENTS

| | | |
|---|---|---|
| DE | 196 23 172 | 10/1997 |
| DE | 197 53 620 | 10/1999 |

\* cited by examiner

*Primary Examiner*—Sheela Chawan
(74) *Attorney, Agent, or Firm*—Collard & Roe, P.C.

(57) ABSTRACT

The invention relates to a method of detecting flaws in the surface of a test object relative to the surface of a flawless master part by constructing in an artificial neuronal net a virtual master part for comparison with characteristic numbers derived from the grey values of sequential images of the test object recorded by a digital camera.

17 Claims, 1 Drawing Sheet

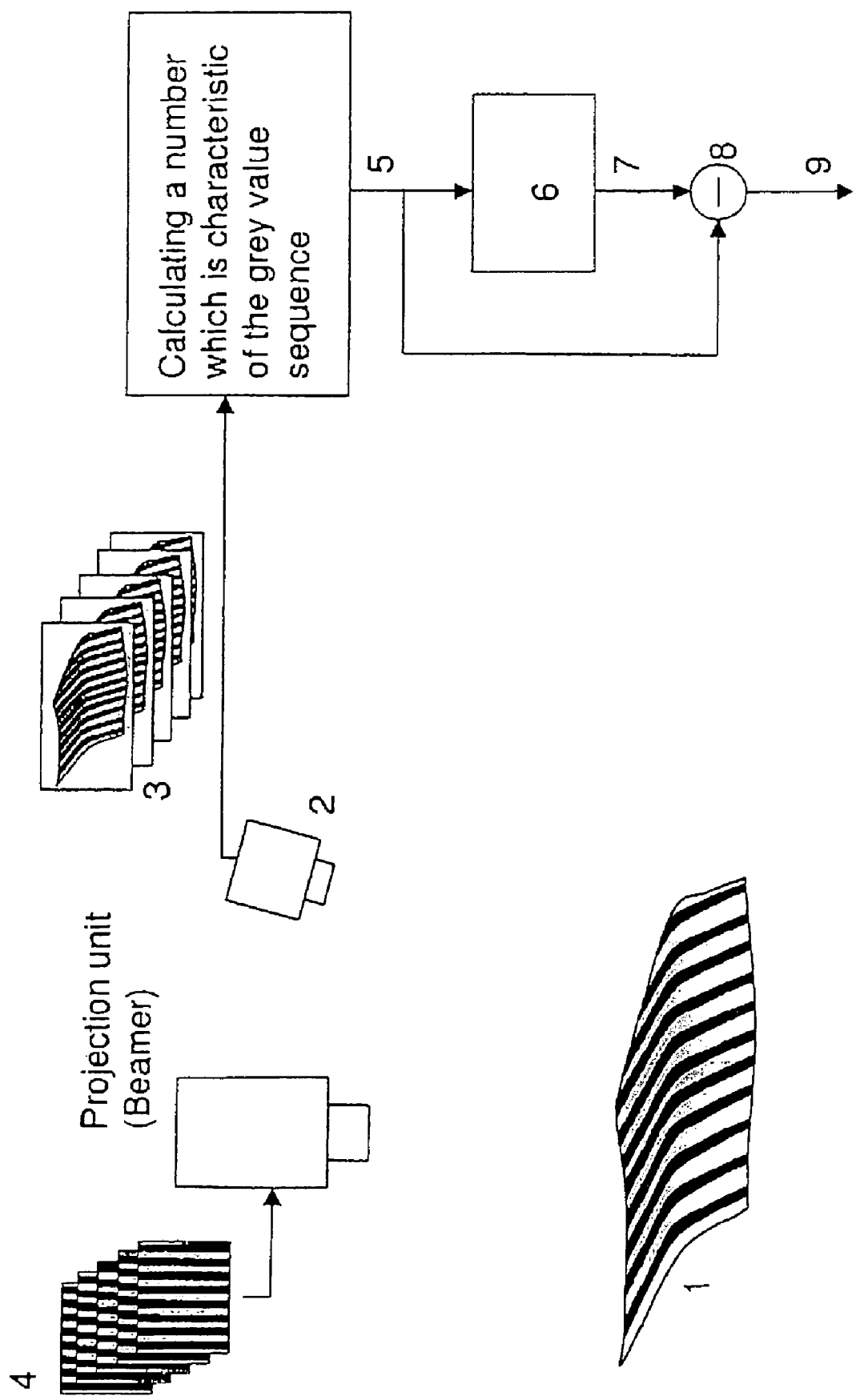

METHOD OF DETECTING FLAWS IN THE STRUCTURE OF A SURFACE

BACKGROUND OF THE INVENTION

1. Field of the Invention

The invention, in general, relates to a novel method of detecting flaws in the surface structure of an object and, more particularly, to a method of detecting flaws in the structure of a surface by comparison with a flawless surface stored in an artificial neuronal net as a virtual master. Preferably, the invention is applied to such tasks as measuring errors which are very small relative to the size of the test object and where for reasons of economic efficiency the measuring position of the test object can only be adjusted with only a low degree of accuracy. Such measuring tasks are encountered, for instance, in monitoring the production of large surface deep drawn sheet components.

2. The Prior Art

A method is known from German patent specification DE 197 53 620.4 C in which three-dimensional measuring data of the surface of a test object are modified by an artificial neuronal net as a virtual master as if three-dimensional measuring data were generated of a flawless test object. By comparing the original three-dimensional measuring data against the artificially generated three-dimensional measuring data flaws, errors and deviations can be detected in the surface.

It is however, a drawback that for detecting flawed spots it is necessary to define three-dimensional data which explicitly characterize the surface structure. These three-dimensional data are often calculated on the basis of digital image data which also characterize, however implicitly, the surface structure including its flawed spots. For the detection of the flawed spots this form of surface characteristic is sufficient.

The complexity of generating three-dimensional measuring data of the surface of the test object is greater as a rule than is the complexity of recording image data. Often the three-dimensional data are calculated on the basis of similar or the same images which in accordance with the invention are utilized directly.

For calculating three-dimensional data of digital images the following methods are particularly well suited: A method of the kind described in DE 196 23 172 C1, a phase shift method of images from two cameras and a the phase shift method utilizing a camera and a projector.

In the calculation of three-dimensional data by one of the mentioned methods it is an important prerequisite that the two cameras or the camera and the projector in the phase shift method are precisely calibrated. This requires additional software. Calibration errors usually result in distortions of the three-dimensional data.

Compared to methods utilizing two cameras, there is a saving of one camera.

OBJECTS OF THE INVENTION

It is an object of the invention to provide a method in which the effect or influence of differences in calibration and tolerable variations in the shape of the test object is substantially or wholly eliminated, so that with a calibration of low complexity even small flaws or errors may be automatically detected by application of a neuronal net without any explicit calculation of three-dimensional data of a test object. In this connection, typical calibration differences and typical tolerable form variations are greater than the flaw to be detected.

SUMMARY OF THE INVENTION

In the accomplishment of these and other objects the invention provides for a method of detecting or recognizing deviations in the surface structure from a predetermined structure by the detection of measurement values and subsequent processing by way of an artificial neuronal net including the steps of projecting a pattern onto the surface and recording images thereof with a matrix camera which generates a set of n sequential images while the projected pattern is shifted or rotated or changed in its structure by predetermined values, of defining from the grey values of a sequence thereof of individual pixels of then images recorded by the matrix camera a number or numbers less than n which are characteristic of the grey value sequence of a given pixel or the grey value sequence of the pixel relative to a grey value sequence or several grey value sequences of other pixels, of recalling the neuronal net after the recorded image data or matrix of the characteristic numbers of the surface have been input in the neuronal net and of utilizing as significant data in respect of deviation values derived from comparing the image data or the matrix of the characteristic numbers of the surface derived from the image data against the recall data of the neuronal net.

By utilization of a neuronal net it is thus possible without significant calibration complexity automatically to detect small errors, flaws or deviations without having explicitly to calculate three-dimensional data of the test object or surface. Typical calibration differences and typical tolerable variations of form have been found to be greater than the errors to be detected.

BRIEF DESCRIPTION OF THE DRAWINGS

The single drawing shows a schematic block diagram of a method according to the invention.

The drawing is shown for illustration purposes only and is not intended to limit the invention.

DETAILED DESCRIPTION OF THE INVENTION

The invention will hereinafter be described in greater detail with reference an embodiment:

The invention provides for a method of detecting or recognizing deviations in the surface structure from a predetermined structure by the detection of measurement values and subsequent processing by way of an artificial neuronal net including the steps of projecting a pattern onto the surface 1 and recording images thereof with a matrix camera 2 which generates a set of n sequential images 3 while the projected pattern 4 is shifted or rotated or changed in its structure by predetermined values, of defining from the grey values of a sequence thereof of individual pixels of the n images recorded by the matric camera a number 5 or numbers less than n which are characteristic of the grey value sequence of a given pixel or the grey value sequence of the pixel relative to a grey value sequence or several grey value sequences of other pixels, of recalling the neuronal net 6 after the recorded image data or matrix of characteristic numbers of the surface have been input in the neuronal net and of utilizing as significant data 9 in respect of deviation values derived from comparing 8 the image data or the matrix of the characteristic numbers of the surface derived from the image data against the recall data 7 of the neuronal net.

The basic problem in seeking to evaluate a test object in respect of possible flaws, errors or deviations from a standard object is as follows:

The objects usually are industrially manufactured ones and their shapes vary as a result of production technology. Mathematical descriptions of a surface, e.g. computer assisted design (CAD) models or a series of flawless actual master parts are usually available. The problem does, however, not only relate to flawed surface formations; sometimes the problem also relates to the position or orientation of a part. Since appropriate data relating to the test object is not readily available it is, therefore, not possible simply by differentiation between the test object and the data of a corresponding master part to extract flaws or deviations. The crux of the invention resides in deriving, by calculations based on data relating to a test object, data for a virtual master part. In the present context, a master part connotes a part without flaws but otherwise in the same position or orientation, global formation and execution as the test object.

This is accomplished during the recall phase of a neuronal net. A neuronal net deemed particularly suitable for purposes of the invention is an associative memory of the kind described in U.S. application Ser. No.: 09/204,485 filed on Dec. 3, 1998 by Michaelis et al. and now specifically incorporated by reference herein, which receives its task related configuration during a training phase.

Recall Phase:

The algorithm for extracting flaws, errors or deviations is initiated by the recording n number of images of the surface or test object to be evaluated by a digital camera. Such images implicitly contain three-dimensional data of the surface.

To supplement the recording of those images, a projector sequentially n number of patterns onto the surface. This is deemed to be an efficient operation for purposes of increasing the amount of data. The n number of patterns usually are striped patterns which are shifted by the $n^{th}$ part of the period of the stripes. Completely different patterns, such as, for instance, stochastic ones which differ in shape or position, may also be utilized.

As a rule it is efficacious to normalize the brightness values of the recorded images as lighting conditions may change between different measurements. Such changes may occur because of brightness changes by the projector or other reflective properties of the surface or test object to be measured. One practical way of normalizing the brightness values of the images is to use so-called dark images and light images. To this end, the projector projects a very bright image and a further image with the projector lamp burning but the projection path darkened as much as possible as if "black stripes" only were being projected. In this manner there would be an upper and a lower brightness value for each pixel upon which the grey values of all pixels of the n number of recorded images are normalized in a conventional manner, such as, for instance, in relation to the difference between the upper and the lower brightness value. Hereinafter, the term "image" will include the images normalized in this or a similar manner.

The surface to be evaluated causes the patterns to be spatially deformed. Thus, the recorded images implicitly contain three-dimensional data regarding the surface. In this connection it is essential that the camera record the image from a different direction than the projection path. The flaws or deviations are then extracted from the data by the following steps.

Initially, there is the problem of the great amount of data. n number of images are present. Accordingly, n grey values and, hence, a sequence of grey values is available for each pixel. This large amount of data might lead to difficulties during processing by the associative memory.

For this reason it is efficacious to reduce the quantity of data. To this end the grey value sequence of a pixel is reduced to a characteristic number. This may be done in the following ways:

One way is to insure that patterns of n stripes of an almost sinusoidal brightness curve are projected vertically of the stripes. While the patterns are of identical shape, they are each shifted by the $n^{th}$ part of the period. Known phase shift methods may thus be utilized.

The result of specific calculations there will be a phase value for each pixel. The phase value relates to the position on one of the sine patterns relative to the zero passage of the sine function. The phase value is a characteristic number for the entire grey value sequence of the pixel.

Another way of calculating a characteristic number is to define the similarity of the grey value sequence of the selected pixel relative to the grey value sequence of a neighboring pixel.

The characteristic number is, for instance, the cross-correlation coefficient between the two grey value sequences. For applying this method to the entire image, the pixels to left or to the right of given pixels are utilized. In this manner, cross-correlation coefficients are defined for the entire image, except for a marginal column or line. These cross-correlation coefficients are modulated by the three-dimensional shape of the surface.

The manner of reducing the quantity of data is not restricted to the described possibilities. Other processes may also be used.

The data may be processed by the associative memory as follows:

One of the described matrices of characteristic numbers will serve as input data. One phase value for each pixel, one correlation value or another suitable characteristic number or the grey values of the n images serve as input data sets for each associative memory. Hence, n differently configured associative memories have to be used. Alternatively, all grey values of the n images may serve as input data for one associative memory. This would mean, however, that such an associative memory would have to be rather more complex than in the previous case, since n relevant data, i.e. grey scale value, are present for each pixel.

Each one of the described matrices implicitly describes the three-dimensional shape of the surface to be evaluated. The corresponding matrix will now be modified by the associative memory in the following manner. A matrix is being generated which could originate with a test object which has no flaws in its surface configuration. It is of the same shape and position as the test object and is called "virtual master part".

Thereafter, it is only necessary to form the difference between the matrices. The flaws will be apparent in the difference; but it is subject to noise. Flaws greater than the noise may thus be extracted by simple threshold formation. The location of the flaws on the surface or the three-dimensional coordinates may then be calculated in a well-known manner.

The Training Phase:

This is the phase during which the associative memory is specially configured in relationship to the test objects.

"Training" is conducted on the basis of the implicit three-dimensional data of actual flawless master parts. These data have to be of the same kind as those of the recall phase, i.,e., they have to be grey values or characteristic numbers of the grey value sequences. The training causes the weight factors to be set or tuned.

Provided the weight factors have been favorably tuned the associative memory will be able on the basis of the data from the test object to generate the data of the associated virtual master part.

What is claimed is:

1. A method of recognizing deviations in the shape of the surface of an object from a predetermined shape by detecting measurement values and subsequently processing the measurement values in an artificial neuronal net, characterized by the steps of:

projecting patterns onto the surface of the object;

recording images of the surface and the patterns by a matrix camera which generates a sequence of n images;

shifting the projected pattern by predetermined values;

defining on the basis of the grey value sequence of individual pixels of the n recorded images at least one number which is characteristic of one of the grey value sequence of a given pixel and of the grey value sequence of the pixel relative to at least one grey value sequence of different pixels;

recalling the neuronal net subsequent to inputting one of the data of the recorded images and the matrix of the at least one characteristic number of the recorded object derived from the image data;

utilizing as significant data of the deviations the comparison between one of the image data and the matrix of the characteristic number of the recorded object derived from the image data and the recall data of the neuronal net.

2. The method of claim 1, further including the step of normalizing the brightnesses of the sequence of n recorded images.

3. The method of claim 1, wherein the comparison between one of the image data and the matrix of the characteristic number of the recorded object derived from the image data and the recall data of the neuronal net further includes the step of forming a difference.

4. The method of claim 1, wherein the projected patterns are striped patterns.

5. The method of claim 4, wherein the projected patterns are patterns of stripes of equal width having a sinusoidal brightness curve vertically of the stripes and wherein the patterns are shifted by an $n^{th}$ part of the period of the stripe.

6. The method of claim 5, wherein a phase value is calculated for each pixel from the corresponding grey values and that a matrix thus obtained is used as an input to the artificial neuronal net.

7. The method of claim 5, wherein for each pixel recorded by the matrix camera the similarity is determined between the grey values of a selected pixel and the grey values of a pixel located at a predetermined distance from the selected pixel and that a matrix thus obtained is used as an input data to the artificial neuronal net.

8. The method of claim 7, wherein the pixel located at a predetermined distance from the selected pixel is a pixel neighboring the selected pixel.

9. The method of claim 7, wherein a cross-correlation coefficient is used as a value for the similarity.

10. The method of claim 7, wherein the sum of the squares of the deviations is used as a value for the similarity.

11. The method of claim 1, wherein the artificial neuronal net comprises three linear layers.

12. The method of claim 11, wherein one of the three linear layers is a hidden layer containing as many neurons as are required for substantially reconstructing all variations in position and form of at least one master part.

13. The method of claim 12, wherein the weights of the net correspond in the order of the size of the eigenvalues to the eigenvectors of the covariance matrix of one of the image data and the characteristic numbers of at least one master part.

14. The method of claim 13, wherein the weights are calculated by one of forming the covariance matrix and subsequent calculation of the eigenvectors and of a suitable learning process (e.g. Hebb's learning rule).

15. The method of claim 14, wherein comparative data between the input data of the artificial neuronal net and the recall data are smoothed by smoothing filters to reduce the effect of interferences in individual pixels in the images recorded by the matrix camera.

16. The method of claim 1, wherein the recall is accomplished by one of a neurocomputer and circuit designed for the task.

17. The method of claim 1, wherein only predetermined image data and characteristic numbers from the object and master parts are utilized.

* * * * *